M. G. SLEMMONS.
Cultivator.
No. 30,357.
Patented Oct. 9, 1860.
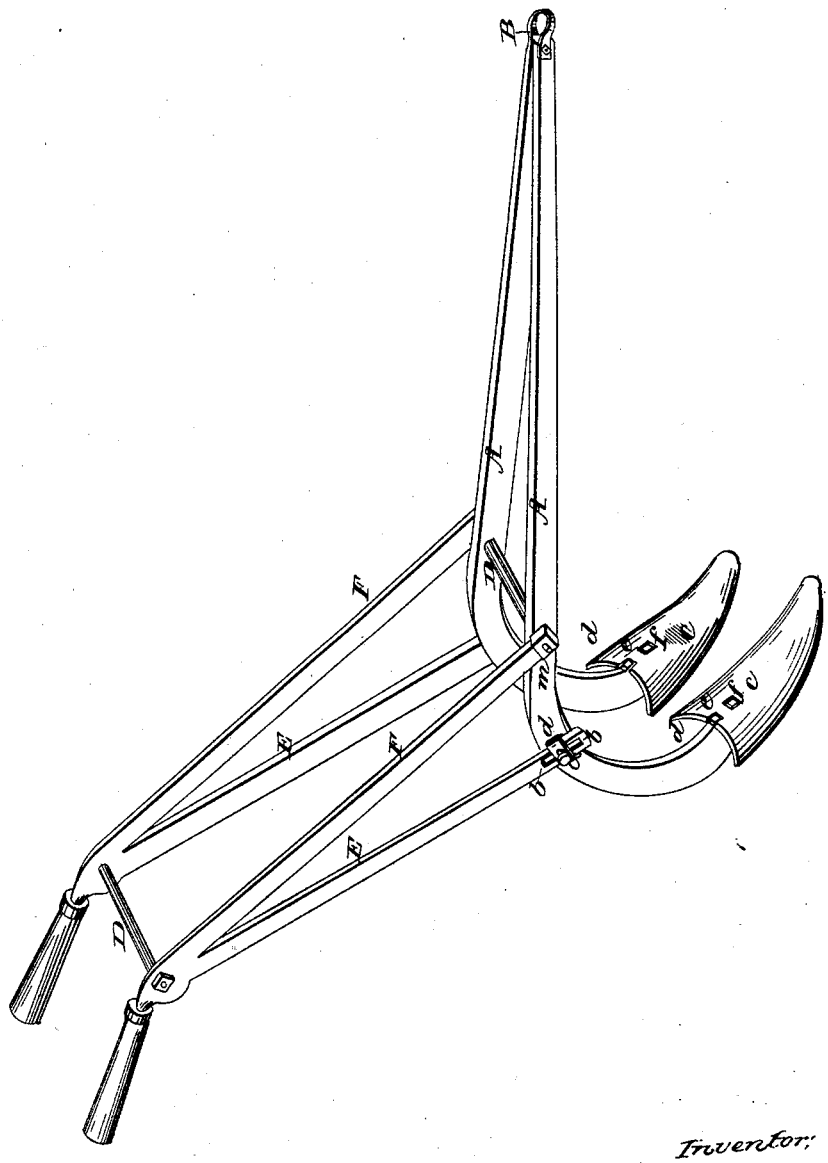
Inventor:
M. G. Slemmons

UNITED STATES PATENT OFFICE.

MATHEW G. SLEMMONS, OF CADIZ, OHIO.

IMPROVEMENT IN PLOWS.

Specification forming part of Letters Patent No. 30,357, dated October 9, 1860.

*To all whom it may concern:*

Be it known that I, MATHEW G. SLEMMONS, of Cadiz, in the county of Harrison and State of Ohio, have invented a new and useful Improvement in Double-Shovel Plows; and I do hereby declare that the following is a full, clear, and exact description of the same, reference being had to the accompanying drawing, forming a part of this specification, in which—

A perspective view of my improved double-shovel plow is represented.

My invention consists in the particular arrangement of the several parts in the manner and for the purpose hereinafter described.

To enable others skilled in the art to make and use my invention, I will proceed to describe its construction and operation.

A A represent two iron beams, which are united at their front ends by means of the pin which retains the clevis B, and spread apart at their rear ends. Each of these beams terminates in a curved standard, so as to support shovels c c, as represented. D is a transverse bar for bracing the beams laterally. The ends of this bar are made round, pass through the beams, and extend some distance beyond the outside face of the same. E E are forked iron handles, braced at the top by a transverse bar, D. The lower prong, E, of each of these handles attaches to the side of the beams by means of loops $a$, slots $b$, and set-screws or pins $c$, while the upper prong, F, attaches to the round end $m$ $m$ of the brace D, so as to turn loosely on the same. It will be observed that the slots allow the handles to be raised and lowered to suit the height of different plowmen, and that the round ends $m$ $m$ of the brace serve as the axis for the handles to turn upon while being adjusted.

The shovels $c$ $c$ are attached to the curved standard of the beams by means of a shoulder, $d$, a notch, $e$, screw-bolt $f$, and a mortise, $g$, as represented.

My plow is very light and yet very durable. It also is capable of being made of any width desired, as the light iron beams can be sprung apart more or less, and the transverse bar be inserted at a point nearer to or farther from the clevis. The forked handles, also, by being light, can be spread apart more or less, accordingly as the beams are spread apart and the position of the transverse bar is changed.

I do not claim any one part of the plow nor the operation of any one part of the same; but What I do claim as my invention, and desire to secure by Letters Patent, is—

The arrangement of the two curved shouldered beams A A, a clevis, B, transverse bar D $m$, slotted adjustable forked handles E E $b$, and notched and mortised shovels $c$ $c$ $e$, in the manner and for the purpose described.

MATHEW G. SLEMMONS.

In presence of—
  LANCELOT HEARN,
  CHAS. PATTERSON.